G. B. GROVER.
MACHINE FOR HOLDING AND PRESSING HEEL BLANKS.
APPLICATION FILED APR. 17, 1916.

1,314,587.

Patented Sept. 2, 1919.
6 SHEETS—SHEET 5.

Inventor:
George B. Grover,
by Wright, Brown, Quinby & May
Attys.

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

MACHINE FOR HOLDING AND PRESSING HEEL-BLANKS.

1,314,587.   Specification of Letters Patent.   Patented Sept. 2, 1919.

Application filed April 17, 1916. Serial No. 91,516.

*To all whom it may concern:*

Be it known that I, GEORGE B. GROVER, a citizen of the United States, of Lynn, in the county of Essex and State of Massachusetts, have invented certain new and useful Improvements in Machines for Holding and Pressing Heel-Blanks, of which the following is a specification.

The object of the present invention is to provide a machine for receiving and pressing heels which have just been built, until the paste or other adhesive used to hold the lifts of the heel together has had time to set or dry or otherwise become sufficiently firm to prevent subsequent separation of the lifts from one another. In the manufacture of heels for boots and shoes it is the practice to coat the lifts of which the heel is composed with some adhesive, such as paste, blue, cement or anything else suitable for the purpose, and to retain the heels thus built under pressure sufficient to hold their lifts firmly together until the adhesive has become firm. The object of the present invention is to provide a holder or retainer for this purpose which may be used in conjunction with a heel building machine, either as part of the machine or adjacent to the heel builder, in which the newly built heels may be placed while the adhesive is still fluid and in which such heels may be clamped so as to hold their lifts together with a sufficient degree of pressure for the purpose; and to provide in the retaining machine a number of heel clamping units or holders so arranged that they may be brought successively one at a time into position for receiving a new heel and for discharging a completed heel, and in which the number of such units is great enough so that between the time when the fresh heel is placed in a clamp and the same clamp has returned to the discharging position, a long enough period has elapsed to enable the adhesive to set or harden so firmly that the lifts of the heel will not come apart in any subsequent handling to which they may be subjected.

The machine which I have shown herein has been described and claimed in connection with an organized heel building machine having an automatic transferring mechanism for removing heels from the building part of the machine to the retaining and pressing part of the machine, in an application for patent filed by me September 4, 1915, Serial Number 49,075, on which Patent No. 1,288,564 was issued December 24, 1918, and the present application in which this holding and pressing mechanism is separately described and claimed is a continuation in part of the one above named. I, therefore, claim in this application all rights and benefits consequent upon the fact of the present application being such continuation of the one above noted. At the same time I give notice that I do not limit the invention here claimed to a holding machine or mechanism adapted to be used only in connection with the specific heel building machine described in the aforesaid application or with any heel building machine. The features in which the invention particularly consists and the principles of the invention appear from the following description of the machine or mechanism embodying said invention and shown in connection with the machine described in my aforesaid application No. 49,075. In addition to the matter divided from said application, the present application includes an improved and novel construction of clamp adapted to prevent sticking of the heel thereto when, as is the case in some widely employed methods of building heels, the outer faces of the heel are coated with adhesive.

Figure 4:
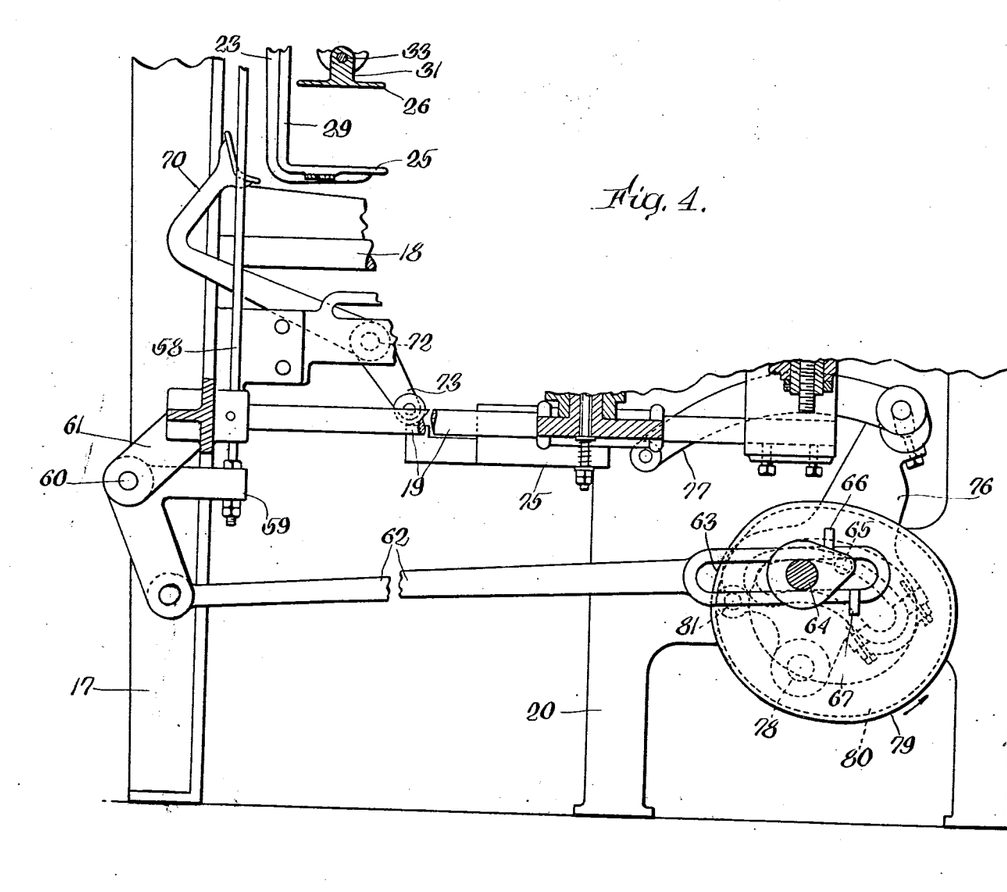
Fig. 4 is a fragmentary sectional view illustrating the driving mechanism for the rotary head of the machine.
Figure 6:
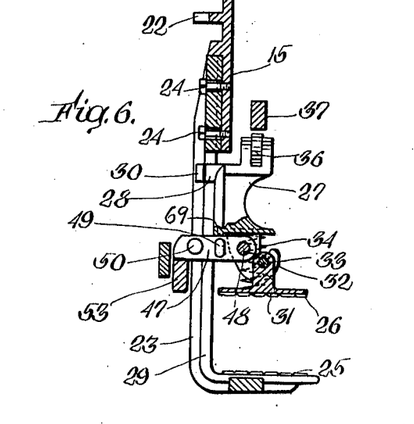
Figs. 6, 7, and 8 are detail sectional views taken on lines 6—6, 7—7, and 8—8 respectively of Fig. 1.
Figure 7:
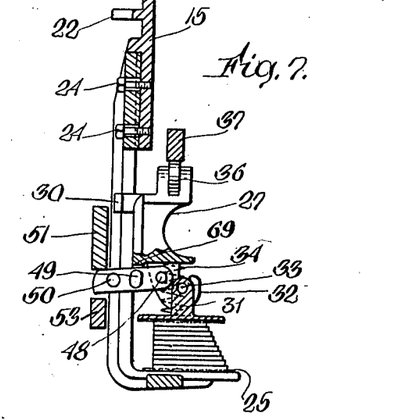
Figure 8:
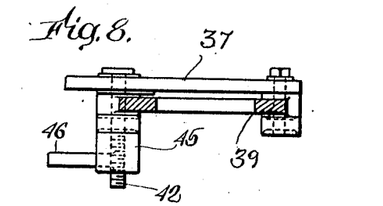
Figure 9:
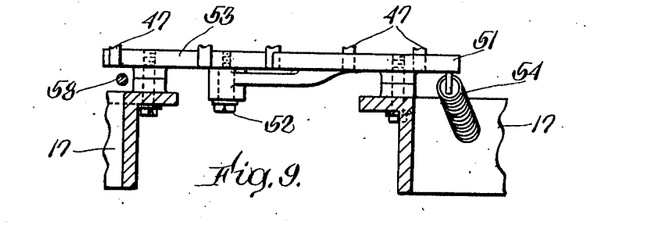
Figs. 9, 10, and 11 are sectional views on lines 9—9, 10—10, and 11—11, respectively of Fig. 2.

This machine comprises essentially a rotary head or carrier 15 having a hub 16 which turns in a bearing in an upright frame 17, such frame being in the embodiment of the machine here shown braced by rods 18, 18, 19, 19, which are connected to other upright frame members, as the part 20, shown in Fig. 4. This rotary head is here constructed as a disk of which the hub is mounted upon a shaft 21 secured in the frame member 17. It is provided also with means by which it can be turned in a step by step rotation for indexing, such means being here shown as a crown ratchet 22. This head carries a large number of clamps or clamping units, as is evident from Figs. 1 and 2. These clamping units are all duplicates of one another and a description of one will suffice for all. Such description is given as follows in connection particularly with Figs. 6 and 7, in which two of the duplicate clamping units are shown. The same reference characters are applied to the corresponding parts of both units.

Figure 1:
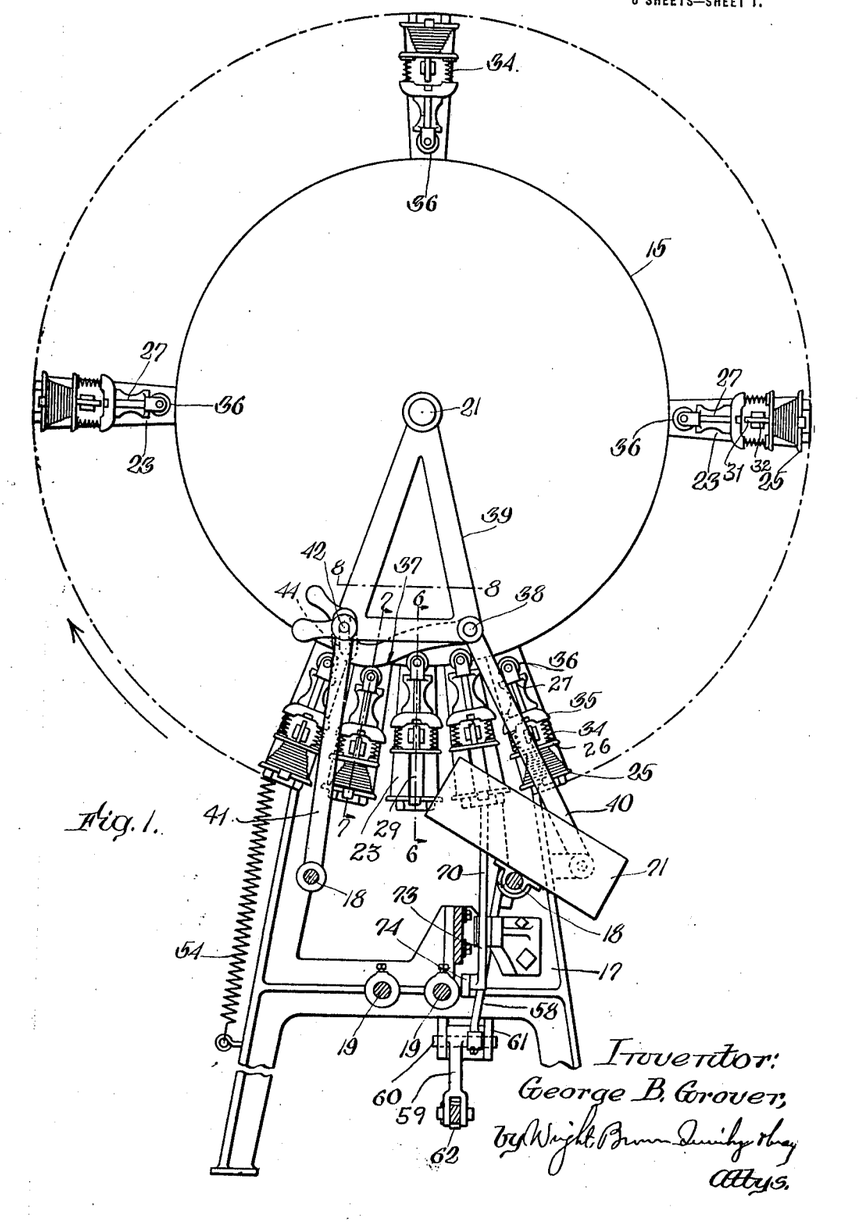
Figure 1 is a front elevation of the mechanism embodying the invention.

Each unit comprises an arm 23 which is secured to the head 15 preferably in a manner such as to permit of a certain amount of adjustment by means of bolts 24—24, passing through slots in the arm. Conveniently also the arms are arranged radially about the center of the head, although I am not restricted to this particular arrangement. The arm carries on its outer end a relatively stationary or rigid clamping member or jaw 25 projecting at substantially right angles to the length of the arm and therefore parallel to the axis of the head. A movable complemental coöperative clamping member or jaw 26 is also mounted on the arm 23, being carried by a slide 27 which is guided to travel lengthwise of the arm by means of a rib or neck 28 on the rear side of the slide which passes through a slot 29 in the arm and has a head 30 on its rear end lying back of the arm and crossing the sides of the slot, as appears from Fig. 1. The clamp member 26 is connected to the slide 27 in a manner which permits free movement so that it may accommodate itself to heels of different pitch, and also in order that it may exert substantially equal and at the same time yieldingly resilient pressures upon heels varying somewhat in height. For this purpose said member has a shank 31 projecting between two hooks 32 on the slide and said shank carries a pivot pin 33 which lies in the hooks 32. Two springs 34 are provided to exert pressure on the clamp member 26, these springs being arranged on respectively opposite sides of the hooks 32, as shown in Fig. 1, being confined between the clamp member and lugs 35 on the slide 27. The slide carries an anti-friction roll 36, which is adapted to travel and roll along a cam 37 and to react against the latter so as to close down the movable clamp member against a heel resting on the fixed clamp member.

Figure 12:
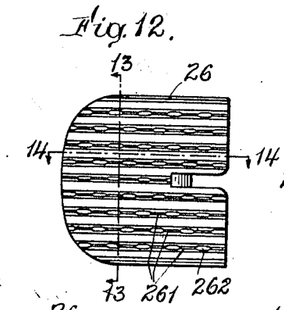
Fig. 12 is a plan view of an improved form of clamp jaw adapted to be used with the machine.
Figure 13:
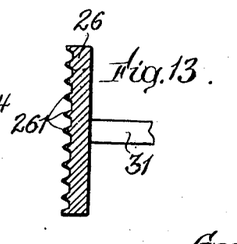
Figs. 13 and 14 are sectional views on the lines 13—13 and 14—14, respectively, of Fig. 12.
Figure 14:
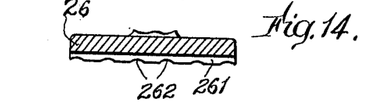

The construction which I prefer to give to either or both of the clamping members of the clamping unit is shown in Figs. 12, 13, and 14 in connection with an illustration in detail, on an enlarged scale, of one of the movable clamping members 26. But before describing this construction I will explain the reason for providing it. In one widely employed method of building heels, the lifts are dipped in a paste, cement, or other adhesive before being assembled; the outermost lifts, which come on the top and bottom of the heel, as well as the intermediate lifts being thus dipped; whence it follows that the outer or end faces of the completed heel blank are coated with wet adhesive. When a heel so made is held between clamping jaws having smooth faces until the adhesive has set, it sticks to the same so firmly that it can be dislodged only with great difficulty, and frequently not at all, except with tearing of its outer lifts. To overcome this difficulty I make the jaws of the clamping units so that they will contact with the heel at only a relatively small number of separated points instead of at all points on the top and bottom surfaces of the heel. The construction which I consider preferable to others is that here shown, which consists in providing ribs or ridges 261 on the face of the jaw or clamping member next to the heel; such face being called, for the purpose of convenient description, the operative face of the clamping member. These ridges are beveled to comparatively sharp edges, as shown in Fig. 13, and are also notched at short intervals; the notches being designated 262. The short and narrow contacting areas of the ribs between their notches are the only parts of the clamping member which bear on the heel, and they have not all together enough surface in contact with the hardened cement to cause the heels to stick objectionably. I do not limit this feature of the invention to the particular formation here described of discontinuous contact points or areas on the clamping members, or even to the provision of such discontinuous points on both clamping members, as any construction of either or both clamping members in a clamping unit which provides spaces or recesses in the face of the clamping member next to the heel is within the scope of the protection herein claimed.

Figure 5:
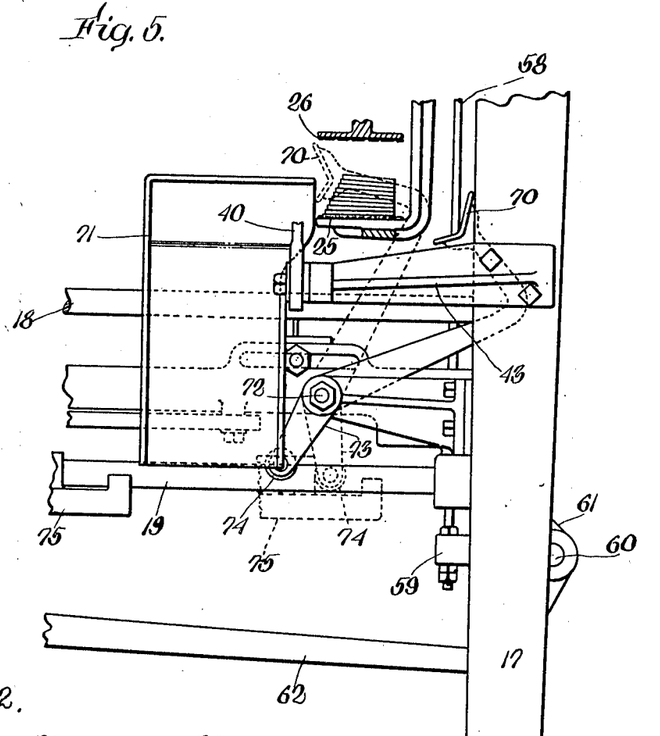
Fig. 5 is an elevation of some of the parts shown in Fig. 4 as viewed from a point at the opposite side of the machine from the view-point of Fig. 4.

Cam 37 referred to is shown best in Fig. 1. It is pivotally hung at one end on a pin 38, which is mounted in a bracket 39 hung from the stud 21 previously described. Said bracket is braced and steadied by links 40 and 41 connected with the pins 38 and 42 on the bracket and with the frame 17, link 40 being thus connected to said frame by a bracket arm 43 which projects from the frame as illustrated in Fig. 5, and link 41 being connected to one of the brace rods 18 of the frame. The pin 42 passes through a slot 44 in the cam arm 37 concentric with pin 38 wherefrom it results that this cam may be adjusted by swinging about this pin as a center. It is secured in its adjusted positions by a nut 45, which is threaded upon the rod 42 and is equipped with a handle 46 for setting it up and releasing it.

The head is rotated in the direction of the arrow shown in Fig. 1 and the rolls 36 of the movable clamping members successively come into engagement with the cam arm 37 and are depressed by the downwardly inclined under surface thereof. The adjustment of the cam arm in the manner and by the means just described enables the pressure applied by the movable clamping member to the heel to be regulated.

The movable clamping member is maintained in contact with the heel after passing beyond the cam 37 by means of a clutch 47 formed as a bar, which is pivoted to the slide 27 on a pivot pin 48 and passes therefrom through the slot 29 of the adjacent arm. This bar carries studs 49 and 50 projecting from its opposite sides and located on respectively opposite sides of the ribs which form the limits of the slot 29. The line of shortest distance between the studs 49, 50 being slightly greater than the thickness of these ribs enables the clutch bar to slide freely when such line is exactly perpendicular to such ribs, but causes it to grip and bind tightly upon the ribs when such line is slightly inclined thereto. It is thus inclined and caused to bind immediately after the movable clamp member has been pressed against the heel as described, by means of a cam 51 at the rear side of the carrier head, which is located close to the rear sides of the arms 23 and has an inclined under surface beneath which the rearwardly projecting end of each bar 47 passes. This cam is pivoted on a stud 52 supported by a bar 53 which crosses the space between the upright side members of the frame 17. The cam 51 is heavily weighted and at the same time it is pulled downward by a spring 54. Said cam might, in fact, be described as a weight having a cam shaped face arranged to make contact with the projecting ends of the clutch bars 47. The yielding manner of mounting said cam weight is, of course, provided in order that the clutch bars may pass under it whatever may be the position in which they are brought in the closing of the clamp. It is obvious that the movable clamping member is moved farther toward the fixed clamping member for a low heel than for a high heel. The cam weight serves to secure the locking clutch in the manner above described in any position by virtue of the capacity for yielding which results from its described mode of mounting.

Figure 10:
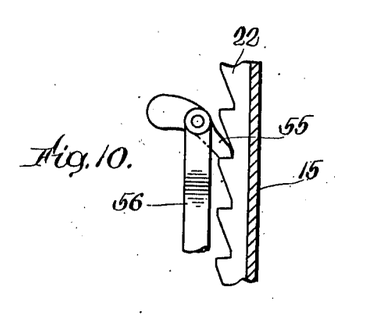

I have shown one of many possible mechanisms which may be provided for giving the carrier head a step by step rotary movement without intending thereby to indicate any limitation of the invention. Said means comprise a pawl 55 (Fig. 10) carried by a reciprocating pawl carrier 56 which is guided to move in a straight line by a bracket 57 mounted on the side of the frame 17. This carrier is connected to a rod 58 which in turn is connected to a bell crank 59 hung by a pivot pin 60 from a bracket 61. The upper substantially horizontal arm of this bell crank is connected to the rod 58, as shown in Fig. 4, while its lower downwardly extended arm is connected to a rod 62 having a slot 63 through which passes a driving shaft 64 on which is a crank pin 65. The rod 62 carries wings 66 and 67 arranged to be struck alternately by the pin 65 whereby the rod 62 is alternately moved back and forth, thus alternately raising and lowering the pawl and giving the rotary head a step by step movement. The ratchet teeth 22, of course, are proportioned so that at each step the head is turned through an angle equal to the angular spacing between adjacent clamping units, whereby at each step each unit is shifted into the position previously occupied by the preceding unit. The mechanism which I have here shown for so driving the head is intended to be merely illustrative of any mechanism adapted for the purpose, and is not intended as in any sense a limitation of the invention to the particular mechanism shown. It is simply a typical mechanism for giving an intermittent or step by step movement to the head.

In the machine as illustrated the clamping unit through which the line 6—6 in Fig. 1 passes is supposed to be in the position for receiving a heel, the movable clamping member being raised. The unit at the left has just been put into the clamping condition by the preceding step movement of the head, and the unit at the right is in the discharging position and has just been opened. On the next step the clamping unit which is in the receiving position will be closed and the one now in discharging position will be brought into receiving position, while the next adjacent unit at the right which is now closed will be opened, brought into the discharging position, and the heel carried by it discharged.

Figure 2:
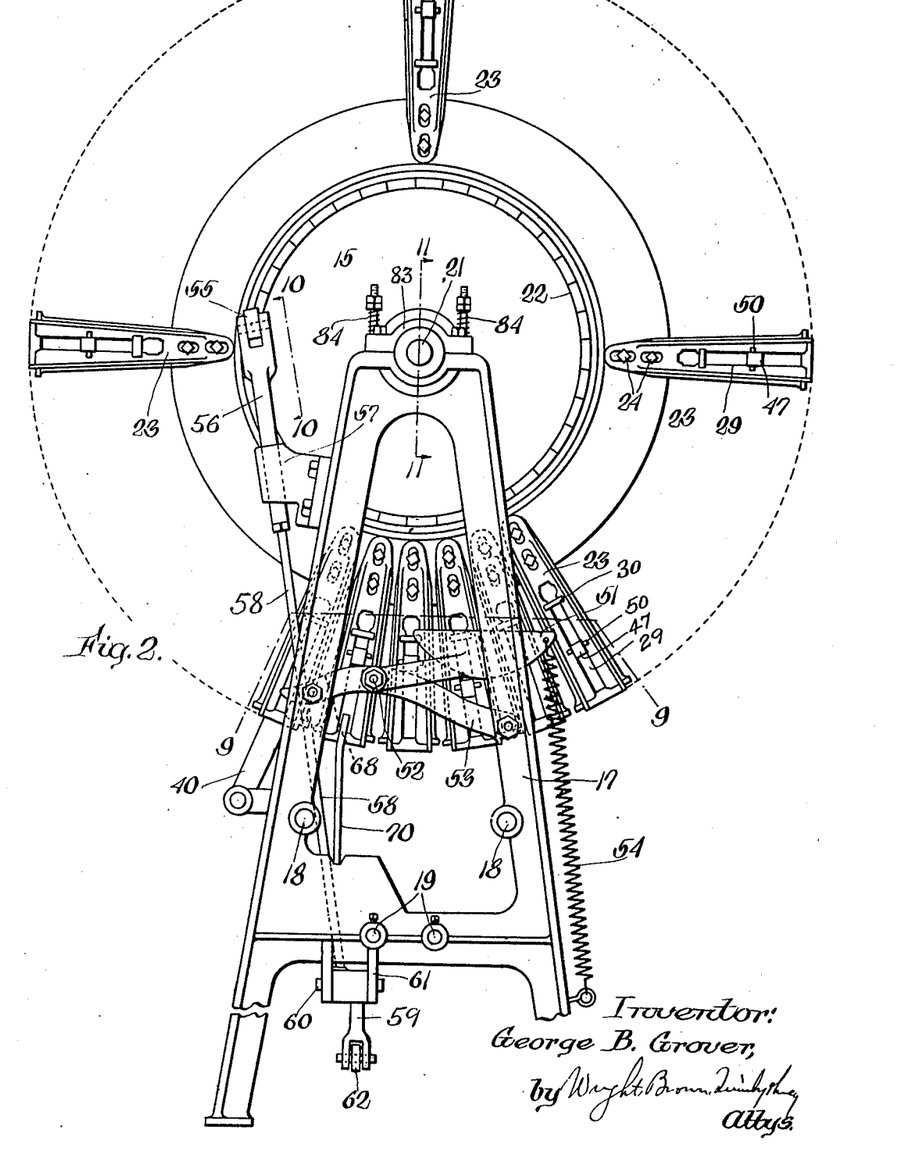
Fig. 2 is a rear elevation of the same.
Figure 3:
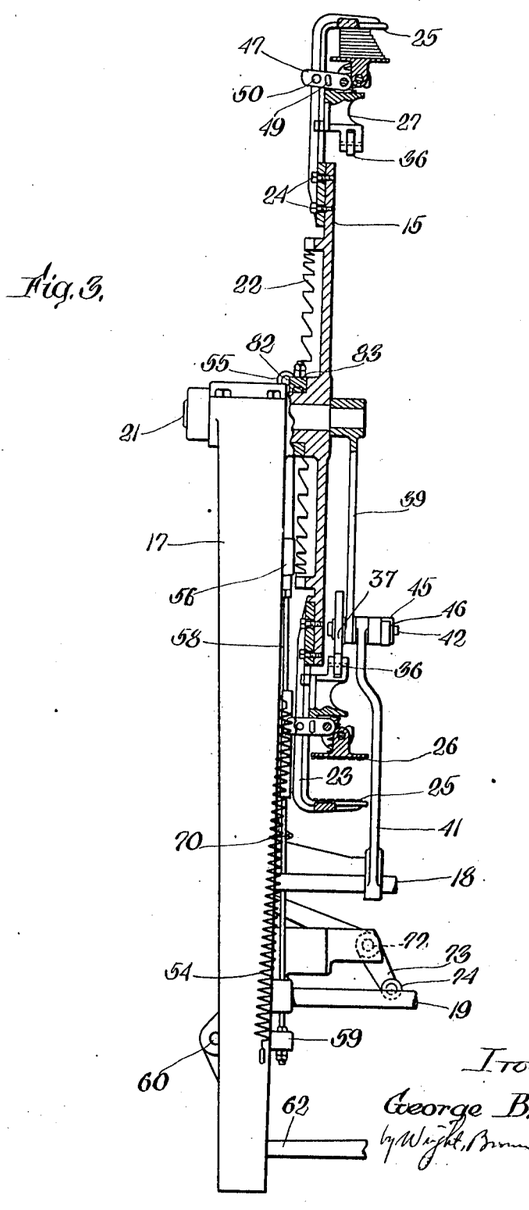
Fig. 3 is a vertical central section of the machine.

The opening of the clamping unit is accomplished by the bar 53 which has an upwardly inclined cam surface 68 at its left hand end (with respect to Fig. 2). The projecting rear ends of the clutch bars 47 ride over this surface and are lifted thereby into the position where their studs 49 and 50 no longer grip. Arriving in this position the clutch bar strikes a shoulder 69 on the slide and the further upward movement imparted by riding over the cam surface 68 lifts the slide and therewith the movable clamp member 26 so that the heel is released. At the end of the step in which the clamping unit is so opened, an ejector 70 passes through the slot 29 from the rear of the unit, strikes the released heel and throws it into a chute 71 from which it slides into a receptacle provided beneath the chute. This ejector, shown in Figs. 4 and 5, is on the end of one arm of a lever which is pivoted on a fulcrum stud 72 on a part of the frame, and has a second arm 73 carrying an anti-friction roll 74. This roll is in the path of a traveler 75, which is mounted to slide on the rods 19 previously mentioned and is so actuated by a lever 76 through a link 77, the lever being pivoted at 78 and actuated by a cam 79 on the shaft 64 which has a cam groove 80 wherein projects a stud 81 on the lever 76. This traveler 75 being moved toward the heel holder strikes the roll 74 and operates the ejector immediately after the head has come to rest upon the completion of each step of its movement.

Figure 11:
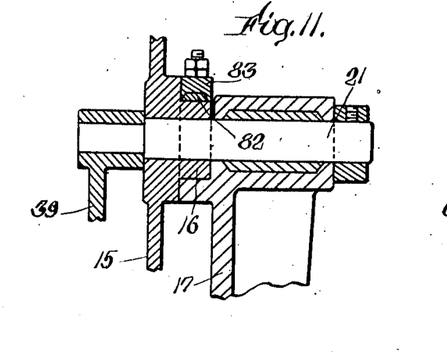

In Fig. 11, 82 represents a brake shoe of frictional material which is held against the hub of the head 15 in a yielding manner by means of a strap 83 against which springs 84 press (Fig. 2).

In operation the head is moved step by step, either regularly or at any time, at the convenience of the operative. In each step a completed heel is ejected, a freshly built heel is placed in an empty clamping unit adjacent to that from which the completed heel has been thrown, and another heel is put under pressure. This pressure is maintained until the clamping unit arrives at the discharging position, where it arrives only after all of the preceding clamps have passed through such position. The number of clamping units is made so great that the time required for any one clamping unit to complete the circuit and reach discharging position is long enough for the adhesive with which the lifts of the heels have been coated to have become so well set that the lifts will not come apart or become displaced in subsequent handling.

Although I have herein described the machine as comprising a rotary head on which clamping units are mounted, I desire to state that I do not limit the invention thus narrowly, but include within the scope of the invention, except as otherwise indicated by the claims, any sort of mechanism in which a number of clamping units are connected together in series and actuated to travel in a closed path.

What I claim and desire to secure by Letters Patent is:—

1. A heel blank holding and pressing machine comprising a rotary carrier, a series of arms mounted upon said carrier, each having a relatively fixed clamping jaw, a complemental clamping member movable toward and away from said fixed jaw, a clutch bar connected to said complemental clamping member having separated gripping lugs, a clutch rib on said arm lying between said lugs of less width than the shortest distance between the lugs, means for rotating said carrier step by step, a cam member adjacent to the path in which the clutch bars travel so arranged that the bar of one clamping member rides thereover at each step of the carrier and is first released from the clutch rib and then caused to withdraw the movable clamping member from the fixed jaw, a second cam located to engage said movable clamping member on a further step of the carrier and constructed to press the said clamping member toward the complemental fixed jaw, and a third cam located and arranged to bear on the clutch bar while the clamping member is so engaged with the second cam and place it in gripping relation with said clutch rib.

2. A heel blank holding and pressing machine comprising a rotary carrier, a series of arms mounted upon said carrier, each having a relatively fixed clamping jaw, a complemental clamping member movable toward and away from said fixed jaw, a clutch bar connected to said complemental clamping member having separated gripping lugs, a clutch rib on said arm lying between said lugs of less width than the shortest distance between the lugs, means for rotating said carrier step by step, a cam member adjacent to the path in which the clutch bars travel so arranged that the bar of one clamping member rides thereover at each step of the carrier and is first released from the clutch rib and then caused to withdraw the movable clamping member from the fixed jaw, a second cam located to engage said movable clamping member on a further step of the carrier and constructed to press the said clamping member toward the complemental fixed jaw, and a third cam located and arranged to bear on the clutch bar while the clamping member is so engaged with the second cam and place it in gripping relation with said clutch rib; said third cam being yieldingly mounted.

3. A machine for holding newly built heel blanks under pressure comprising a series of clamping units, each embodying an arm, a relatively stationary clamping jaw fixed on said arm and a complemental clamping member mounted to slide on said arm toward and away from the said jaw, a carrier to which said clamping units are attached, movable in a manner which causes the units to travel in a closed circuit or path, means for moving said carrier step by step, a cam adjacent to the path in which said units move mounted and arranged to apply pressure upon the movable clamping member of each unit toward the complemental fixed jaw, and thereby close the clamping unit upon a heel placed therein, said cam being adjustable to regulate the pressure applied thereby upon the clamping members in accordance with the character of the heels operated upon, a clutch bar pivoted to the movable clamping member having gripping studs embracing a portion of said arm and adapted to grip the latter when placed at an inclination thereto, a yieldingly mounted clutch actuator arranged in position to engage said clutch and place it in the gripping position while the clamping member is under pressure applied by said cam, and a clutch-releasing device arranged to engage said clutch and move the same out of its gripping position at a point in said path in advance of the point at which the said clamp actuating cam is located.

4. A machine for holding heel blanks under pressure comprising a series of clamping units and a carrier on which said units are mounted, said carrier being constructed and mounted in a manner such as to carry the clamping units in a closed path, each clamping unit comprising an arm having a rigidly connected clamp jaw, a complemental clamping member mounted to slide on said arm toward and away from the jaw, a clutch bar pivoted to said sliding clamping member having separated gripping studs, the arm having a clutch rib of less width than the line of shortest distance between said studs, the latter being adapted to grip said rib when placed with such line at an inclination to the rib, a shoulder on said clamping member arranged to prevent swinging of the clutch bar away from the fixed jaw beyond the position in which such line is approximately perpendicular to said rib, a stationary cam mounted beside the path in which said clutch bars travel in position to engage such bars at the side thereof toward the fixed jaw and constructed to move said bars away from said jaw, whereby it serves first to unlock the clutch and then to withdraw the clamping member from the jaw positively, and means adjacent to another point in the travel of the clamping units constructed and arranged to force the movable clamping member toward the fixed jaw.

5. A machine for holding heel blanks under pressure comprising a series of clamping units, a carrier on which said units are mounted, constructed and arranged to move said units in a closed path, each of said clamping units comprising a relatively fixed clamping member and a relatively movable coöperating clamping member, and having also an opening from front to rear between said clamping members, means for separating the movable clamping member from the fixed clamping member at one point in the path wherein said units travel, means for shifting the movable clamping member toward the fixed clamping member at another point in such path, and an ejector in a position intermediate the above-named points movably mounted and constructed to pass through the said opening in the unit to engage and dislodge the heel carried by the clamping unit after release thereof by withdrawal of the movable clamping member.

6. A machine for holding newly built heels under pressure comprising a connected series of clamping units, each unit consisting of an arm having a rigid jaw, a slide movable upon said arm, a complemental clamping member flexibly connected to said slide, springs interposed between said slide and said complemental clamping member arranged to exert pressure on the latter toward said fixed jaw, and a clutch for locking the slide in position to clamp a heel; a relatively stationary member positioned to be engaged by said slide for shifting the latter into heel clamping position, and another relatively stationary member for releasing said slide and withdrawing it from the fixed jaw.

7. In a machine of the character described, a clamping unit comprising an arm having a relatively fixed clamping jaw, a slide mounted on said arm and guided so that it may move toward and away from said jaw, a complemental clamping member loosely connected to said slide, two springs interposed between said slide and the complemental clamping member arranged on relatively opposite sides of the connection between said member and the slide, and a clutch carried by the slide arranged to grip said arm so as to hold the slide in heel clamping position.

8. In a machine of the character described, a clamping unit comprising an arm having a fixed clamping jaw and a guiding slot, a slide mounted on said arm and movable toward and away from said fixed jaw, a complemental clamping member carried by the slide, and a clutch bar pivoted to the slide projecting through said slot and having gripping studs embracing a portion of the arm between them and adapted to bind against the arm for securing the slide in gripping position.

9. In a machine of the character described, a heel clamping unit comprising an arm having a fixed clamping jaw, a slide mounted on said arm and movable toward and away from said jaw, said slide having a pair of hooks projecting toward the jaw, a complemental clamping member constructed with a shank arranged between said hooks and a pivot pin engaged with the hooks, said slide having abutments at each side of said hooks and springs arranged between said abutments and the complemental clamping member on respectively opposite sides of said hooks.

10. A machine for retaining heels under pressure comprising a series of clamping units, means for propelling said units intermittently in a closed circuit, each unit comprising a body having a relatively fixed gripper and a complemental gripper movably mounted on the body and guided to move toward and away from the fixed gripper, a stationary cam arranged adjacent to the path in which said clamping units travel in position to be engaged by said movable clamping member and constructed to displace the latter clamping member, the said clamping unit having a clutching rib, a clutch bar pivoted to the movable clamping member and provided with projections embracing said rib and being adapted to grip the same and a second cam located beside the path in which the said clutch bars are carried in position to be engaged by the bars successively and constructed to release each clutch bar and to displace the movable clamping member from the fixed clamping member upon arrival of each clamping unit at the location of the said second cam.

11. A machine for holding heels under pressure comprising a series of clamping units each embodying a relatively stationary clamping member and a relatively movable clamping member guided to move toward and away from the relatively stationary clamping member, said unit having a clutching rib, a clutch bar connected to the relatively movable clamping member having gripping studs on opposite sides of said rib, a carrier on which said units are mounted and by which they are carried in a closed circuit, a stationary cam beside one point in such circuit arranged to be engaged by the relatively movable clamping member and constructed to press the latter toward the relatively fixed clamping member, a second cam adjacent to another point in said circuit in position to place the clutch bar in gripping relations with the rib of each clamping unit immediately after the relatively movable clamping member of said unit has been placed in clamping position, and a third cam beside a different point in said circuit in position to engage said clutch bar and constructed to release the same from the clutching rib and shift the relatively movable clamping member away from the relatively fixed clamping member.

12. A machine for holding heels under pressure comprising a series of clamping units each embodying a relatively stationary clamping member and a relatively movable clamping member guided to move toward and away from the relatively stationary clamping member, said unit having a clutching rib, a clutch bar connected to the relatively movable clamping member having gripping studs on opposite sides of said rib, a carrier on which said units are mounted and by which they are carried in a closed circuit, a stationary cam beside one point in such circuit arranged to be engaged by the relatively movable clamping member and constructed to press the latter toward the relatively fixed clamping member, a second cam adjacent to another point in said circuit in position to place the clutch bar in gripping relation with the rib of each clamping unit immediately after the relatively movable clamping member of said unit has been placed in clamping position, the said second cam being yieldingly mounted whereby to actuate said clutch bar for the purpose indicated in any position thereof relatively to the fixed clamping member.

13. In a machine of the character described in combination with the traveling carrier and a series of clamping units connected thereto, each having relatively fixed and relatively movable clamp members and a clutch for securing said relatively movable members in clamping position; a stationary clamp-closing cam bar, a relatively stationary yieldingly mounted clutch operating bar and a stationary clutch-releasing and clamp-opening cam.

14. In a machine of the character described in combination with a traveling carrier and a series of clamping units connected thereto, each having relatively fixed and relatively movable clamp members and a clutch for securing said relatively movable members in clamping position; a stationary clamp-closing cam bar, and means for positioning said bar adjustably whereby to vary the extent of closing movement imparted thereby to the relatively movable clamp.

15. A machine for holding heel blanks under pressure comprising in combination with a traveling carrier and a series of clamping units connected thereto, each having relatively fixed and relatively movable clamp members and a clutch for securing said relatively movable members in clamping position; a stationary clamp closing cam bar and a stationary clutch releasing and clamp opening cam.

In testimony whereof I have affixed my signature.

GEORGE B. GROVER.

Copies of this patent may be obtained for five cents each, by addressing the "Commissioner of Patents, Washington, D. C."